United States Patent
Whymark

(10) Patent No.: US 7,039,931 B2
(45) Date of Patent: May 2, 2006

(54) MULTI-MARKET BROADCAST TRACKING, MANAGEMENT AND REPORTING METHOD AND SYSTEM

(75) Inventor: Thomas J. Whymark, Bethlehem, PA (US)

(73) Assignee: Nielsen Media Research, Inc., New York, NY (US)

( * ) Notice: Subject to any disclaimer, the term of this patent is extended or adjusted under 35 U.S.C. 154(b) by 107 days.

(21) Appl. No.: 10/465,722

(22) Filed: Jun. 19, 2003

(65) Prior Publication Data

US 2004/0015400 A1    Jan. 22, 2004

Related U.S. Application Data

(63) Continuation-in-part of application No. 10/278,332, filed on Oct. 23, 2002, which is a continuation-in-part of application No. 10/274,018, filed on Oct. 18, 2002.

(60) Provisional application No. 60/384,362, filed on May 30, 2002.

(51) Int. Cl.
*H04N 7/16* (2006.01)
*H04N 7/10* (2006.01)

(52) U.S. Cl. ............... 725/32; 725/22; 725/34; 725/35; 725/36

(58) Field of Classification Search ........... 725/22, 725/32, 34–36
See application file for complete search history.

(56) References Cited

U.S. PATENT DOCUMENTS

| | | | |
|---|---|---|---|
| 2,881,244 A | 4/1959 | Pawley et al. |
| 3,845,391 A | 10/1974 | Crosby |
| 4,025,851 A | 5/1977 | Haselwood et al. |
| 4,079,419 A | 3/1978 | Siegle et al. |
| 4,230,990 A | 10/1980 | Lert, Jr. et al. |
| 4,313,197 A | 1/1982 | Maxemchuk |
| 4,425,661 A | 1/1984 | Moses et al. |
| 4,547,804 A | 10/1985 | Greenberg |
| 4,805,020 A | 2/1989 | Greenberg |
| 4,945,412 A | 7/1990 | Kramer |
| 4,967,273 A | 10/1990 | Greenberg |
| 5,450,490 A | 9/1995 | Jensen et al. |
| 5,579,124 A | 11/1996 | Aijala et al. |
| 5,652,615 A | 7/1997 | Bryant et al. |
| 5,719,937 A | 2/1998 | Warren et al. |
| 5,774,170 A | 6/1998 | Hite et al. |
| 5,774,452 A | 6/1998 | Wolosewicz |
| 5,787,334 A | 7/1998 | Fardeau et al. |

(Continued)

*Primary Examiner*—Christopher Grant
*Assistant Examiner*—Son P. Huynh
(74) *Attorney, Agent, or Firm*—Hanley, Flight & Zimmerman, LLC

(57) ABSTRACT

A method of analyzing multi-market broadcasts of commercial advertisements, has unique identifiers are assigned to a plurality of expected commercial advertisements, information regarding the plurality of expected commercial advertisements and respective unique identifiers is recorded in a computer database, electronic detections of a plurality of actual market-broadcast instances of a commercial advertisement are received, which comprise a plurality of broadcast markets, information regarding the detections is recorded in a computer database, related ones of the plurality of actual market-broadcast instances of the commercial advertisement is recorded in a computer database, which comprising a plurality of broadcast markets, information regarding a plurality of multi-market broadcast orders of commercial advertisements is recorded in a computer database, and related ones of the actual market-broadcast instances of the commercial advertisement are associated with a related multi-market broadcast order for said commercial advertisement in a computer database, where the multi-market broadcast order comprises the plurality of broadcast markets.

19 Claims, 11 Drawing Sheets

U.S. PATENT DOCUMENTS

| | | |
|---|---|---|
| 5,822,360 A | 10/1998 | Lee et al. |
| 5,826,165 A * | 10/1998 | Echeita et al. ................ 725/22 |
| 6,075,551 A | 6/2000 | Berezowski et al. |
| 6,353,929 B1 | 3/2002 | Houston |
| 6,799,326 B1 * | 9/2004 | Boylan et al. ................ 725/35 |

| | | |
|---|---|---|
| 2002/0059578 A1 * | 5/2002 | Nishiura ...................... 725/22 |
| 2002/0178445 A1 * | 11/2002 | Eldering et al. .............. 725/32 |
| 2003/0070167 A1 * | 4/2003 | Holtz et al. ................... 725/32 |
| 2003/0101454 A1 * | 5/2003 | Ozer et al. .................... 725/42 |

\* cited by examiner

FIG. 7

| | | | | | | | | |
|---|---|---|---|---|---|---|---|---|
| Flight PON | : AI | | | | | | | |
| Flight Client | : YNOT! | | | | | | | |
| Market | : NATL | | | | | | | |
| Start Date | : 2001/10/01 - 2002/10/14 | | | | | | | |
| Network | Program | Week Of | MTWTFSS | TimeSlot | ISCI | Purch | Air Dates | Duration |
| ABC | ABC NEWS:NL-MON | 2001/11/05 | YNNNNNN | 12:35 AM-01:05 AM | ZZYN9220* | 1 | 2001-11-05 - 2001-11-05 | 30 |
| | | 2001/11/12 | YNNNNNN | 12:35 AM-01:05 AM | ZZYN9220* | 1 | 2001-11-12 - 2001-11-12 | 30 |
| | THIS WEEK | 2001/11/05 | NNNNNNY | 09:00 AM-10:00 AM | ZZYN9220* | 1 | 2001-11-11 - 2001-11-11 | 30 |
| | COLLEGE FTBALL | 2001/11/05 | NNNNNYN | 12:00 PM-03:00 PM | ZZYN9220* | 1 | 2001-11-10 - 2001-11-10 | 30 |
| | | 2001/11/19 | NNNNNYN | 03:30 PM-07:00 PM | ZZYN9220* | 1 | 2001-11-17 - 2001-11-17 | 30 |
| | AMERICA 01 | 2001/11/05 | NNNNYNN | 08:00 PM-09:00 PM | ZZYN9220* | 1 | 2001-11-09 - 2001-11-09 | 30 |
| | MILLIONAIRE-MON | 2001/11/05 | YNNNNNN | 08:00 PM-09:00 PM | ZZYN9220* | 1 | 2001-11-05 - 2001-11-05 | 30 |
| | SAT MOVIE | 2001/11/05 | NNNNNYN | 08:00 PM-11:00 PM | ZZYN9220* | 1 | 2001-11-10 - 2001-11-10 | 30 |
| | WHOSE LINE-8PM | 2001/11/05 | NNNYNNN | 08:00 PM-08:30 PM | ZZYN9220* | 1 | 2001-11-08 - 2001-11-08 | 30 |
| | NFL MNF-SHOWCASE | 2001/11/12 | YNNNNNN | 09:00 PM-09:08 PM | ZZYN9220* | 1 | 2001-11-12 - 2001-11-12 | 30 |
| | NYPD BLUE (TUE) | 2001/11/05 | NYNNNNN | 09:00 PM-11:00 PM | ZZYN9220* | 1 | 2001-11-06 - 2001-11-06 | 30 |
| | | 2001/11/12 | NYNNNNN | 09:00 PM-10:00 PM | ZZYN9220* | 1 | 2001-11-13 - 2001-11-13 | 30 |
| | NFL MON. NIGHT F | 2001/11/12 | YNNNNNN | 09:08 PM-11:00 PM | ZZYN9220* | 1 | 2001-11-12 - 2001-11-12 | 30 |
| | 20/20-WED | 2001/11/12 | NNYNNNN | 10:00 PM-11:00 PM | ZZYN9220* | 1 | 2001-11-14 - 2001-11-14 | 30 |
| | ONCE & AGAIN | 2001/11/05 | NNNNYNN | 10:00 PM-11:00 PM | ZZYN9220* | 1 | 2001-11-09 - 2001-11-09 | 30 |
| | PHILLY | 2001/11/12 | NYNNNNN | 10:00 PM-11:00 PM | ZZYN9220* | 1 | 2001-11-13 - 2001-11-13 | 30 |
| | ABC NEWS:NIGHTLI | 2001/11/05 | YYYYYNN | 11:30 PM-12:00 AM | ZZYN9220* | 1 | 2001-11-07 - 2001-11-09 | 30 |
| | | 2001/11/12 | NYNNNNN | 11:30 PM-12:00 AM | ZZYN9220* | 1 | 2001-11-13 - 2001-11-13 | 30 |

FIG. 8

MULTI-MARKET BROADCAST TRACKING, MANAGEMENT AND REPORTING METHOD AND SYSTEM

RELATED APPLICATIONS

This application is a continuation-in-part of U.S. application Ser. No. 10/278,332, filed Oct. 23, 2002, pending, which is a continuation-in-part of U.S. application Ser. No. 10/274,018, filed Oct. 18, 2002, pending, which is a continuation-in-part of Provisional U.S. Application Ser. No. 60/384,362, filed May 30, 2002, expired.

FIELD OF THE INVENTION

The invention pertains to the field of commercial broadcast advertising, and in particular, to confirming and reporting on fulfilled and unfulfilled broadcast advertising orders.

BACKGROUND AND SUMMARY OF THE INVENTION

Broadcasts on commercial broadcast mediums, such as commercial radio or television airwave frequencies, cable television systems, or satellite television or satellite radio systems typically include commercial advertising interspersed within and among featured programs, such as shows, sporting events and news programs. Broadcasts are transmitted on predefined channels of broadcast mediums, however a particular broadcast may be transmitted on more than one broadcast medium at the same time. In particular, broadcast television stations, which historically transmitted solely via commercial television airwaves, are now commonly re-transmitted via (i.e., are carried by) cable television systems and satellite broadcast systems as well. Further, the broadcast medium used to deliver the broadcast to a consumer may be operated by a carrier system that is independent of the originator of the broadcast—as is often the case with a broadcast from a broadcast television station delivered to consumers via a cable or a satellite television system.

The broadcasts of multi-market broadcasters, such as national television broadcast networks, national cable network channels, national radio broadcast networks, satellite channels, and the like, include multiple broadcast markets. Examples of national television broadcast networks include ABC, NBC and CBS; examples of nation cable network channels include ESPN, CNN, The Comedy Channel, HBO, etc. To compensate for time differences between distant markets, multi-market broadcasters may transmit (or may direct others to transmit on their behalf) multiple feeds of their broadcast. These feeds may be simply time-delayed or may also include changes in the programming. Some events, like speeches and certain championship sporting events may be covered live across all time zones.

The responsibility for the selection and arrangement of featured programs (i.e., the programming) varies by the type of broadcaster. In the case of television broadcasts, local television stations typically have an affiliation to (and may be owned by) a national television broadcast network (e.g., ABC, NBC, or CBS). The national television broadcast network typically determines and provides all of the programming during predefined "prime time" hours, which are generally the evening hours during which the viewing audience reaches a maximum. The programming during these time periods may be delivered to each affiliated local television station from the national television broadcast network in one or more so called "network feeds." Local radios stations may have a similar affiliation with a national radio broadcast network that determines certain programming of the local radio station broadcast.

The programming of local broadcasters and of multi-market broadcasters (e.g., a national cable network channel) may also be provided in part by a syndicator, which owns rights to distribute certain programs that are in "syndication." In the case of a local television broadcaster affiliated with a multi-market broadcast network, programming provided by a syndicator is broadcast in non-prime time hours. Typically syndicators provide programming in all or a large number of the markets in a nation or region.

For the purposes of this description, the organization that determines the programming of a broadcast is described as the broadcast originator or distributor of that programming. Thus, a national broadcast television network is the broadcast originator or distributor of programming which is (usually) aired during prime time hours, and other shows of national interest, which the network produces for its affiliates to carry. Examples of non-prime time hour shows which a network produces are news shows such as Meet The Press, some sporting events such as the Kentucky Derby, or even network-produced soap operas. Many times the network feed is carried live by the affiliate, sometimes the local affiliate may elect to shift the time of the program. Similarly, a syndicator distributes its programming to stations around the country. However these program offerings are not restricted to any one network, and could be on, for example, the ABC affiliate in one market, CBS in another, FOX in a third, etc. Further, the broadcast time may vary from market to market. Finally the local station is the originator of some of its programming. For example, a local television station is typically the broadcast originator (or distributor) of non-prime time programming not in syndication, such as a local news program.

Advertisers of commercial goods and services may purchase space for advertising from any of the three types of broadcast originators (or distributors) during the time for which the distributor is the broadcast originator for the programming of a broadcast. An advertising "buy" from a particular distributor may include detailed specifications as to the space(s) desired for the advertisement, such as the featured programs, dates, days of the week, time range, duration, markets and number of instances. The purchase may be for commercial air time on a market or outlet basis (spot or local cable), or it could be at the national network level where it is part of the national feed sent out across the country. Advertisers also include detailed specifications as to the particular content or advertisements to be placed in the desired spaces (i.e., "traffic" information) sometimes with the buy details and other time as a separate set of instructions. The combination of the buy and traffic specifications is referred to herein as "flight information."

To enhance the effect of broadcast advertising campaigns, an advertiser will often purchase advertising space from a number of different distributors with varied buy and traffic information. Further, typically such purchases may be arranged and managed by an advertising agency or media buyer that may have a large number of such clients. Therefore, it can be appreciated that the tasks of managing and confirming fulfillment of advertising orders can be complex and burdensome.

In an effort to confirm that orders for advertising have been properly fulfilled, entities responsible for broadcasting advertisements (i.e., the broadcast originators or distributors) typically produce sworn affidavits in which the affiant declares that the orders have been satisfied. However, these affidavits are not prepared by disinterested persons and, in addition, are subject to human error. Other efforts to confirm that orders for advertising have been properly fulfilled include the employment of independent human viewers to manually catalog broadcasts of advertisements. This method is also subject to human error, and this method is not feasible for the currently large and continually growing number of broadcasts. Further methods include electronic monitoring of broadcasts. However, none of the confirmation methods known heretofore provide significant advantages or improvements in matching multi-market broadcasts of advertisements to multi-market advertising orders or in providing dynamic reports regarding fulfilled and unfulfilled orders.

Therefore, what is desired is broadcast advertisement tracking, managing and reporting method and system that provide accurate, independent confirmations of the fulfillment of broadcast advertising orders, that provide significant advantages in matching multi-market broadcasts of advertisements to multi-market advertising orders, that provide significant advantages in reporting of fulfilled and unfulfilled orders and that provide such matching, confirmation and reporting for a large number of broadcasts over a large number of broadcast markets.

The present invention overcomes the limitations of prior methods of confirming fulfillment of orders for broadcast items, such as commercial advertising orders, and provides substantial improvements in the efficiency and accuracy of such confirmation and in the ability to produce dynamic reports or fulfilled and unfilled orders. A system established according to the present invention includes a plurality of electronic detection devices located in the various broadcast markets that are configured to receive and analyze broadcasts on a number of channels of a number of broadcast mediums.

The detection devices detect instances of actual broadcasts of encoded broadcast items, such as encoded advertisements, and record information regarding each detected actual broadcast in a log. Any suitable method for encoding or assigning unique codes to broadcast items may be employed with the present invention; however, preferably the method is able to detect the date, time, channel and duration of the broadcast item, in addition to the code.

In the method of the present invention, detection information is consolidated from the plurality of detection devices and processed. In the processing of detections, related multi-market detections of instances of actual broadcasts of encoded broadcast items are associated to one another, by one or more computing devices, using various reference data and published program schedules. The associated multi-market detections are then associated with a related multi-market order received from an advertiser or agency to indicate whether, and to what extent, the multi-market order has been fulfilled. Further, single-market detections of instances of actual broadcasts of encoded broadcast items are associated with related market focused advertising orders (i.e., "spot" buys) to indicate whether (and to what extent) the single-market advertising order has been fulfilled. In addition to recognizing accurately fulfilled advertising orders, the method also recognizes a number of predetermined commonly occurring errors in fulfilling orders, such as the broadcast of an incorrect advertisement in the correct space. The method also provides detailed reports of fulfilled, erroneous and unfulfilled advertising orders, with the ability to quickly and conveniently access or, "drill down" to, detailed information regarding the individual detections associated with multi- and single-market advertising orders.

BRIEF DESCRIPTION OF THE DRAWINGS

For a complete understanding of the above and other features of the invention, reference shall be made to the following detailed description of the preferred embodiments of the invention and to the accompanying drawings, wherein:

FIGS. 3–11 are examples reports and queries generated by the present method and system.

DETAILED DESCRIPTION OF THE PREFERRED EMBODIMENTS

Step 1—Reference Information

Figure 1:
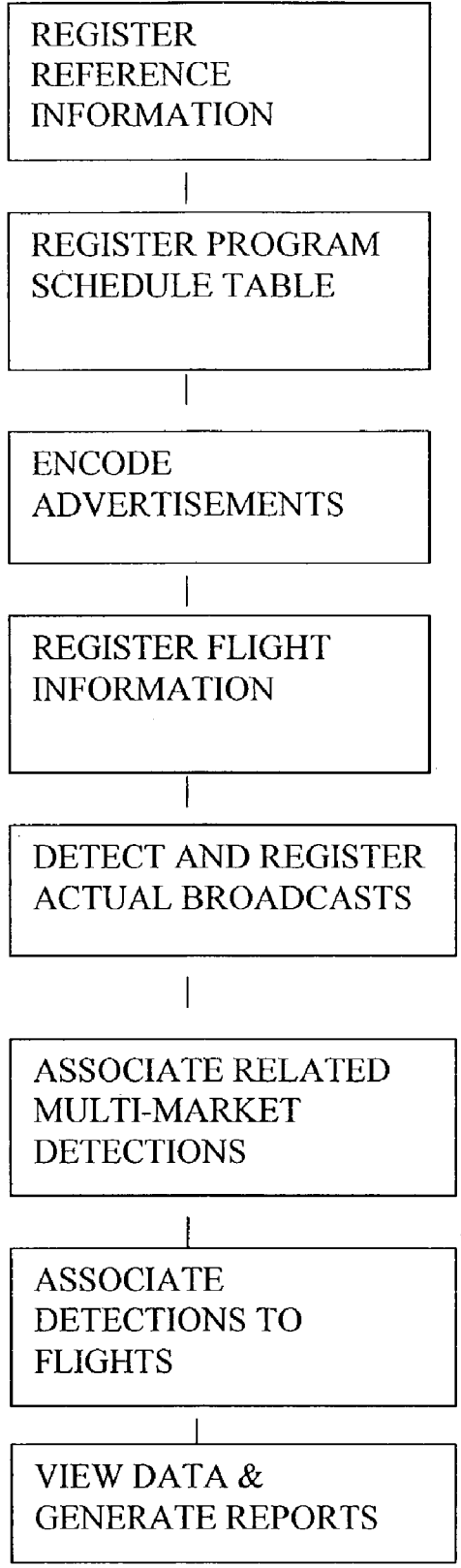
FIG. 1 is a schematic diagram of the method of the present invention.

Referring to FIG. 1, a first step in the method of the present invention comprises the gathering and registration of certain reference information to be used in associating related detections of actual broadcasts of encoded broadcast items (e.g., encoded advertisements) with one another, and in associating such detections to related advertising orders. Such reference information includes advertising agency (media buyer) information, broadcaster information, syndication information, monitoring device information, and authorized user information.

Agency Information

Agency information includes information on the advertisements for which each agency is responsible, the definition of the "broadcast day" for the agency, and the time allowances for each agency, which may vary depending on the client, and the type of advertising (e.g., national broadcasts to be heard in multiple markets, or broadcasts in single markets).

Preferably, in the present system, clients with both multi-market and single-market advertising campaigns are given two distinct CLIENT codes to distinguish campaigns in the system and to allow variations in other configurations of the system.

For each agency, the "broadcast day" may not match with the calendar day. Often the broadcast day begins and ends at 1 or 2 a.m. and sometimes as late as 6 a.m. The definition may vary depending on the client and the type of advertisement that is being placed for the client (i.e., either a multi-market or national advertisement order, or a single-market focused advertisement order). This information may be stored in a broadcast day computer database table having the following fields:

BROADCAST DAY TABLE
AGENCY NAME (or code)
CLIENT NAME (or code)
CUT-OFF TIME

The agency information also includes information regarding the time allowances customarily given to distributors for placing advertisements, which may vary depending on the agency and client, and whether the advertisement is for a multi-market (e.g., national) advertising campaign or a single-market campaign. The time allowance is commonly +/−2 minutes for a single-market advertising order and 0 minutes for a multi-market (or "national") order. This information may be stored in a time allowance database table having the fields identified below.

TIME ALLOWANCE TABLE
        AGENCY NAME (or code)
        CLIENT NAME (or code)
        FROM TIME ALLOWANCE
        END TIME ALLOWANCE In flight information, different agencies may use various abbreviations or codes for different channels or distributors. For example, one agency may use "DSC" for "The Discovery Channel", while another may use "DISC" or "TDC", etc. Therefore, the system preferably includes a call letter translation table to convert call letters provided by agencies in flight information to a standard code for the system. The call letter translation table may contain the following fields:

CALL LETTER TRANSLATION TABLE
    AGENCY NAME (or code)
    CLIENT NAME (or code)
    AGENCY VERSION OF CALL LETTER
    SYSTEM VERSION OF CALL LETTER Broadcaster Information Information for Broadcast Networks, Local Broadcaster stations, National Cable Networks, and syndication settings are stored in a station table containing station/broadcaster information.

STATION TABLE
    CALL LETTER
    BROADCAST MARKET
        (e.g., "NY" or "LA", etc. for single-market or "NATL" for multi-market, or national)
    NATIONAL CALL LETTER (affiliated network if broadcast station)
    STATION TYPE For example
    Broadcast station WABC in New York would be defined as
        WABC, NY, ABC, TV
    National Cable channel SCIFI would be defined as
        SCIFI, NATL, SCIFI, CTV
    National Syndicator Columbia Tristar would be defined as
        CTS, NATL, CTS, STV
    National Network ABC would be defined as
        ABC, NATL, ABC, TV The system also contains additional information regarding the "prime time" of national broadcast networks. This information can be stored in a prime time table having the following fields:

PRIME TIME TABLE
    NATIONAL CALL LETTER
    BROADCAST MARKET
    DAY OF WEEK
    FROM TIME
    TO TIME

Syndication Information

The information regarding syndications includes syndicator names, which may be partial or complete names and an associated code for the syndicator, which may be an abbreviated code. This information may be stored in a syndicator table having the following fields:

SYNDICATOR TABLE
    SYNDICATOR NAME
    SYNDICATOR CODE

Syndication information also includes programs known to be in syndication and the associated syndicator. This information may be stored in a syndication programs table having the following fields:

SYNDICATION PROGRAMS TABLE
    SYNDICATION PROGRAM NAME
    SYNDICATOR CODE

Syndication information further includes a list of programs in syndication that appear on different days of the week in different markets. This information may be stored in a weekly syndication table having the following fields:

WEEKLY SYNDICATION TABLE
    SYNDICATION PROGRAM NAME

Split Channels

Cable distributors sometimes elect to vary the source of the broadcast that is distributed on a given frequency (channel). For example, a cable distributor may choose to air children's programming in the morning, and then change the feed to pick up a news program in the afternoon and evening. As another example, a cable network may sublet part of its broadcasting day to another channel.

To properly attribute the source of the broadcast, the system preferably includes a split channel table having the following fields:

SPLIT CHANNEL TABLE
    REPORTED CALL LETTER
    BROADCAST MARKET
    MONDAY
    TUESDAY
    WEDNESDAY
    THURSDAY
    FRIDAY
    SATURDAY
    SUNDAY
    FROM TIME
    TO TIME
    SOURCE CALL LETTER

Monitoring Device Information

The information regarding the electronic monitoring devices of the system includes a unique identifier for each device and the broadcast market in which the device is physically located. This information may be stored in a monitoring device table, having the following fields:

MONITORING DEVICE TABLE
    DEVICE I.D.
    DEVICE MARKET

Time Adjustment for the Cable Networks

Another reference table of the system contains information that defines the default time adjustment value for each market that is to be applied to detections on cable networks to associate related actual detection records to each other. From a schedule time adjustment viewpoint, the primary difference between broadcast networks and national cable networks is that national cable networks typically transmit the same signal across multiple time zones. So, the published schedules of national cable networks span multiple time zones. Therefore, the system includes a table that holds the appropriate time adjustments for cable network programs in specific markets with respect to a base time zone (e.g., ET). The information may be stored in a national cable time adjustment table having the following fields:

NATIONAL CABLE TIME ADJUSTMENT TABLE
    NATIONAL CALL LETTER
    BROADCAST MARKET
    TIME ADJUSTMENT

SEASONAL TIME SHIFT (fmdttm &todttm range)
FEED (e.g., "East" or "West")

Cable networks may have one feed or may have multiple, time-delayed feeds. To account for the difference in the local time of programs in various markets, the TIME ADJUSTMENT fields of the records in the national cable adjustment table for each market are predetermined and include a time adjustment value appropriate to adjust a local time of a program or detection in that market to the corresponding time in a base time zone (e.g., ET).

In the case where a cable network has one feed, the programs are aired simultaneously in each market. In this instance, the local time of each program will vary depending on the time zone of the market. Thus, a record in the national cable adjustment table for the LA market for a one-feed cable network may have a TIME ADJUSTMENT field equal to −180 (minutes).

Other cable networks have multiple feeds, which are usually identical East and West coast feeds that are simply time delayed 3 hours to adjust for the time difference between the Eastern and Pacific time zones. Thus, a program on at a local time of 9 p.m. on the East coast is also on at a local time of 9 p.m. for the West coast. However, the program will appear at a different local time in markets in time zones between the Eastern and Pacific time zones, such as markets in the Central and Mountain time zones.

Thus, the values of the TIME ADJUSTMENT fields in the records of national cable adjustment table for such multi-feed cable networks for certain markets (e.g., market in the Eastern and Pacific time zones) will be zero (0). However, the values of such TIME ADJUSTMENT fields for markets between the Eastern and Pacific time zones will depend on which feed the particular market receives (i.e., either the East or West coast feed) and the relevant time zone. Such values are preferably predetermined and placed in the appropriate records of the national cable adjustment table. These TIME ADJUSTMENT values of the national cable adjustment table are employed to populate the TIME ADJUSTMENT fields of records in the program schedule table during processing of the cable network schedules.

Step 2—Program Schedule Table

Published Schedule Information

Another step in the method comprises gathering and registering published schedule information from various markets to build a multi-market schedule table. Certain schedules, such as television broadcast and cable schedules are published in advance and are publicly available. Further, such schedules are often available in electronic format, or in a format that may be converted to an electronic format. Typically, separate schedules are published for each television market and include a date, a name (or description) of each featured program (which program may be a show, sporting event or news event, etc.), a channel number, call letters for the broadcaster, and a start and end time. This information is gathered from the published schedules preferably by a computer algorithm adapted to locate and extract the desired information. The scheduled program data is preferably gathered on a regular basis, for example daily or weekly. A history of schedule information is preferably maintained in the program schedule table until such time as it is no longer needed.

Once gathered, the information is placed into the following fields of the program schedule table:
PROGRAM SCHEDULE TABLE
DATE
PROGRAM NAME
BROADCAST MARKET
CALL LETTER
TYPE OF STATION
START TIME
END TIME
NATIONAL CALLLETTER
DISTRIBUTOR
TIME ADJUSTMENT Distributor Determination Then, for each program listing in the program schedule table, a look-up is performed in the station table, based on the CALL LETTER field of the program schedule table to determine the network affiliation of the broadcaster of each program listing, if any. The code for the network affiliation of the broadcaster, if any, is then placed in the NATIONAL CALL LETTER field and in the DISTRIBUTOR field of the appropriate record in the program schedule table. This indicates, at least presumptively, that the affiliated national broadcast network is responsible for the program. If there is no network affiliation for the broadcaster, then the value in the CALL LETTER is copied to both the NATIONAL CALL LETTER field and DISTRIBUTOR field to indicate, at least presumptively, that the local broadcaster is responsible for the program.

Then, each program listing in the broadcast schedule table is compared to the prime time table information to determine if the program listing occurs outside "prime time" for that broadcast market/national call letter/day-of-week combination. If the program listing occurs outside the FROM TIME and TO TIME of the BROADCAST MARKET+NATIONAL CALL LETTER+DAY OF WEEK combination then, the PROGRAM NAME in the program schedule table is compared to the SYNDICATION PROGRAM NAME field in the syndication program table to determine if the program is a known program in syndication. If a match is found, then the associated SYNDICATOR CODE of the syndication program table is copied to the DISTRIBUTOR code of the program schedule table to indicate that the syndicator is responsible for the program.

Intra-day Time Adjustments

For each schedule date, the START TIME for each program listing in the program schedule table is then compared to the START TIME of a first occurrence of a like DATE+PROGRAM NAME+DISTRIBUTOR combination in the program schedule table in a predetermined base market (e.g., the NY market). A TIME ADJUSTMENT field in the record for the first occurrence in the base market is set to zero (0) and the TIME ADJUSTMENT field in the compared record is set to the time difference (in minutes) between the START TIME of the first occurrence and the START TIME of the compared record. Preferably, the TIME ADJUSTMENT field has a negative value if the value in the START TIME field of the first occurrence of the combination in the base market is greater than that of the compared record.

Non-standard Overrides

If desired, the TIME ADJUSTMENT field for certain program listings may be corrected using predefined program instructions specifically tailored to set the correct time adjustment value for specific DATE+DAY OF WEEK+BROADCAST MARKET+START TIME combinations.

Weekly Syndication

Some programs in syndication occur on different days of the week in different markets. Therefore, after the intra-day time adjustment process is completed, the PROGRAM NAME field of each program listing in the program schedule table within a 7-day (inter-day) window, in the base market (e.g., the NY market), is compared to the SYNDICATION PROGRAM NAME field of the syndications programs table. If a match is found, then the program listings for all markets within the same inter-day window are compared to the first occurrence of the PROGRAM NAME+DISTRIBUTOR combination in the base market. If a match is found, the TIME ADJUSTMENT field of the compared record is adjusted according to the difference in time (in minutes) between the DATE+START TIME of the first occurrence of the program and the DATE+START TIME of the compared record. For example if a syndicated weekly program is scheduled to first occur in the NY market on Friday at 10:30 a.m. and also to occur in the LA market on Thursday at 9:30 a.m., then the TIME ADJUSTMENT field for the program listing in the LA market would be −1500 minutes (25 hours×60 minutes/hour earlier).

Cable Networks

A separate schedule process is used to analyze and register the program schedules for cable networks. Broadcast station schedules are relatively complex and are therefore preferably stored individually. Schedules for national cable channels are not as complex, and need not be stored separately on a market by market basis, one per feed is stored.

As stated above, cable networks may have a single feed or may have multiple, time-delayed feeds. For single-feed cable networks, preferably only one record is created in the program schedule table for each program, and the START TIME and END TIME for the record are the times in the base time zone (e.g., ET). For multiple-feed cable networks, preferably one record is created for each feed for each program (e.g., 2 records for each program for a cable network having and East cost and West coast feeds), and the START TIME and END TIME of the records are set according to Eastern and Pacific time zones.

For Cable networks with multiple feeds each schedule is compared to the schedule of the base market in a manner similar to that described above for broadcast stations and the local time difference (if any) between programs is placed in the TIME ADJUSTMENT field of the record in the program schedule table related to that program for that feed. If the schedules of each feed are merely time delayed and are otherwise identical, the local times of related programs will be the same. Thus, the TIME ADJUSTMENT fields will contain a value of zero (0).

Step 3—Encode Advertisements

By industry custom, individual advertisements are assigned a unique code that may be used to distinguish the advertisement from others and may be used to determine the advertising agency and client responsible for the advertisement. This code is often referred to as the ISCI code or the Ad-Id.

Advertisements or other broadcast items to be tracked by the method are assigned a unique detection code, which is preferably the same as the associated ISCI code. Preferably, the detection code is embedded within the audio and/or video signal of the advertisement in a manner that permits the electronic extraction of the detection code during subsequent playback of the advertisement using specially adapted detection equipment. However, any other suitable method will suffice. For example a method of assigning and detecting a unique detection code that does not require the alteration of the original advertisement is within the scope of the method of the present invention. Such a unique code could be based on the inherent audio and/or video content of the advertisement, and thus is considered herein to be (inherently) "embedded", notwithstanding the fact that the original advertisement is not altered.

Information regarding the encoded advertisements may be held in an encoded advertisements table having the following fields:

ENCODED ADVERTISEMENTS TABLE
AGENCY ISCI CODE
CLIENT NAME
AGENCY NAME
DURATION
MULTI-MARKET BROADCAST
ENCODED ISCI CODE
COMMERCIAL TITLE

When commercials are registered in the system the MULTI-MARKET BROADCAST field is set to indicate whether the commercial is intended for a multi-market (e.g., national) advertising order or for a single-market advertising order, where, for example a value of "Y indicates a national order. Since agencies can be hired and fired, it is possible that a previously encoded commercial could be used in a new advertising campaign by a new agency. In the present method, information regarding the agency, the advertisements associated with the agency and the date range that the agency is associated with the advertisement are held in an agency commercial table having the following fields:

AGENCY COMMERCIAL TABLE
   AGENCY ISCI CODE
   AGENCY NAME (or Code)
   CLIENT NAME (or code)
   START DATE
   END DATE
   ENCODED ISCI CODE
     (if different this is the detected value)

Step 4—Flight Information

Flight information may be provided by (or on behalf of) an agency in two parts—one part containing the "buy" information and a second part containing the traffic information, or may be provided as one unit. Buy information may be delivered or available in electronic form, such as an ASCII text computer file having separate line items for the buy information. The format of such files may vary somewhat depending on the agency or source, however the format is usually similar amongst different sources and is typically consistent within any given source. Traffic information may be delivered electronically, verbally or in paper form.

Buy information typically includes the following information:

CLIENT
PRODUCT DESCRIPTION
ESTIMATE NUMBER
CALL LETTER (if single-market, or "spot")
NATIONAL CALL LETTER
  (if multi-market, or "national")
START DATE
END DATE
DAY ROTATION (e.g., M–F, SAT)
LENGTH OF SPOT
START TIME
END TIME
PROGRAM NAME
UNITS
AGENCY ISCI CODE (from some sources)

The buy information is preferably first loaded into one of a plurality of holding tables that is specific to the source of the buy information. This step is preferably accomplished using a parsing program, specific to the source of the buy information, that extracts the data from the buy information and loads the data into appropriate fields of the holding table.

Then a conversion program converts the buy information into the format described below and loads the information into a flight information table. In the conversion, a separate record is created for every unit specified in each line item of the buy information. For example, if a line item of the buy information specifies 3 UNITS, then the line item of the buy information will be converted to three records in the flight information table, each record having an ITEM NUMBER of "1 of 3", "2 of 3" or "3 of 3", respectively. The total number of spots in the line item of the buy information is recorded in a TOTAL SPOTS field in each of the records related to the line item of the buy information. Further, the START DATE, END DATE and DAY ROTATION information indicated in the line item of the buy information is converted (if necessary) to a WEEK OF field and daily fields: MONDAY, TUESDAY, WEDNESDAY, THURSDAY, FRIDAY, SATURDAY and SUNDAY. For example, if the DAY ROTATION value in the buy information was M–W, the values for the daily fields would be Y,Y,Y,N,N,N and N, respectively.

Further, during conversion, a look-up is performed in the time allowance table, based on the AGENCY+CLIENT fields in each flight record to obtain the associated time allowance from the time allowance table. A FROM ALLOWANCE field of the flight record is set to equal the FROM TIME field less the FROM TIME ALLOWANCE, and a TO ALLOWNCE field of the flight record is set to equal the TO TIME field plus the TO TIME ALLOWANCE. If the traffic information is included with the buy information, the associated ISCI codes are placed in an ISCI GROUP field for each record of the flight information table.

If the traffic information is delivered separately from the buy information, then the associated ISCI codes for the line item of the buy information are added manually either prior, during or after conversion of the buy information to the flight information table. ISCI information, if not provided in the buy schedule can be entered into a Traffic Rules table. This table allows the system to automatically apply pre-defined traffic rules to new revisions in flights. These rules tell the system how to fill in default ISCI values or filter out items in the flight which are not being tracked.

Further, if the buy information relates to a multi-market (e.g., national) advertisement order, the CALL LETTER field of the record in the flight table for each line in the buy contains the National Network, Cable or Syndication call letter. (e.g., "ABC" for the ABC network), and the BROADCAST MARKET field value is set to "NATL". If the buy is for a single-market or local distributor level then the CALL LETTER field will contain the call letter for the local broadcaster or cable channel and the BROADCAST MARKET field value is set to the value of that individual market (e.g., "NY" or "LA", etc.). The BROADCAST MARKET is obtained via a look up of the market in the station table. The call letter translation table may be employed during this process to translate call letters provided by the agency.

After the conversion is performed and the initial reference information is added, the following fields of the flight information table are generally populated.
  FLIGHT INFORMATION TABLE
  CLIENT
  ESTIMATE NUMBER
  AGENCY
  CALL LETTER
  BROADCAST MARKET
  PROGRAM NAME
  TOTAL SPOTS PURCHASED
  ITEM NUMBER
  FROM TIME
  TO TIME
  FROM ALLOWANCE
  TO ALLOWANCE
  WEEK OF
  MONDAY
  TUESDAY
  WEDNESDAY
  THURSDAY
  FRIDAY
  SATURDAY
  SUNDAY
  ISCI GROUP
  DURATION
  FLIGHT MATCHED (initially set to 0)
  FLIGHT PURCHASED (initially set to 1)
  FLIGHT ROW NUMBER
  DETECTION I.D. (typically not populated at this point)
    (or, DETECTION ROW NUMBER)

As described below, each record of the flight information table includes other fields for associating flight information to detections of broadcast advertisements. For example, the records of the flight information table include a DETECTION I.D. field which is used to associate flight records to detection records, as described further below.

If an agency revises an advertising buy order, the system compares the buy information already in the system with the new information and applies corrections to the tables as needed. This process may simply overwrite the records in the flight information table related to the same flight "estimate" within the date range specified in the revised buy information. Depending on the contents of the change, the change may also require the traffic information (i.e., the ISCI GROUP) to be reviewed and possibly reapplied to the new flight records.

Step 5—Detections

Figure 2:
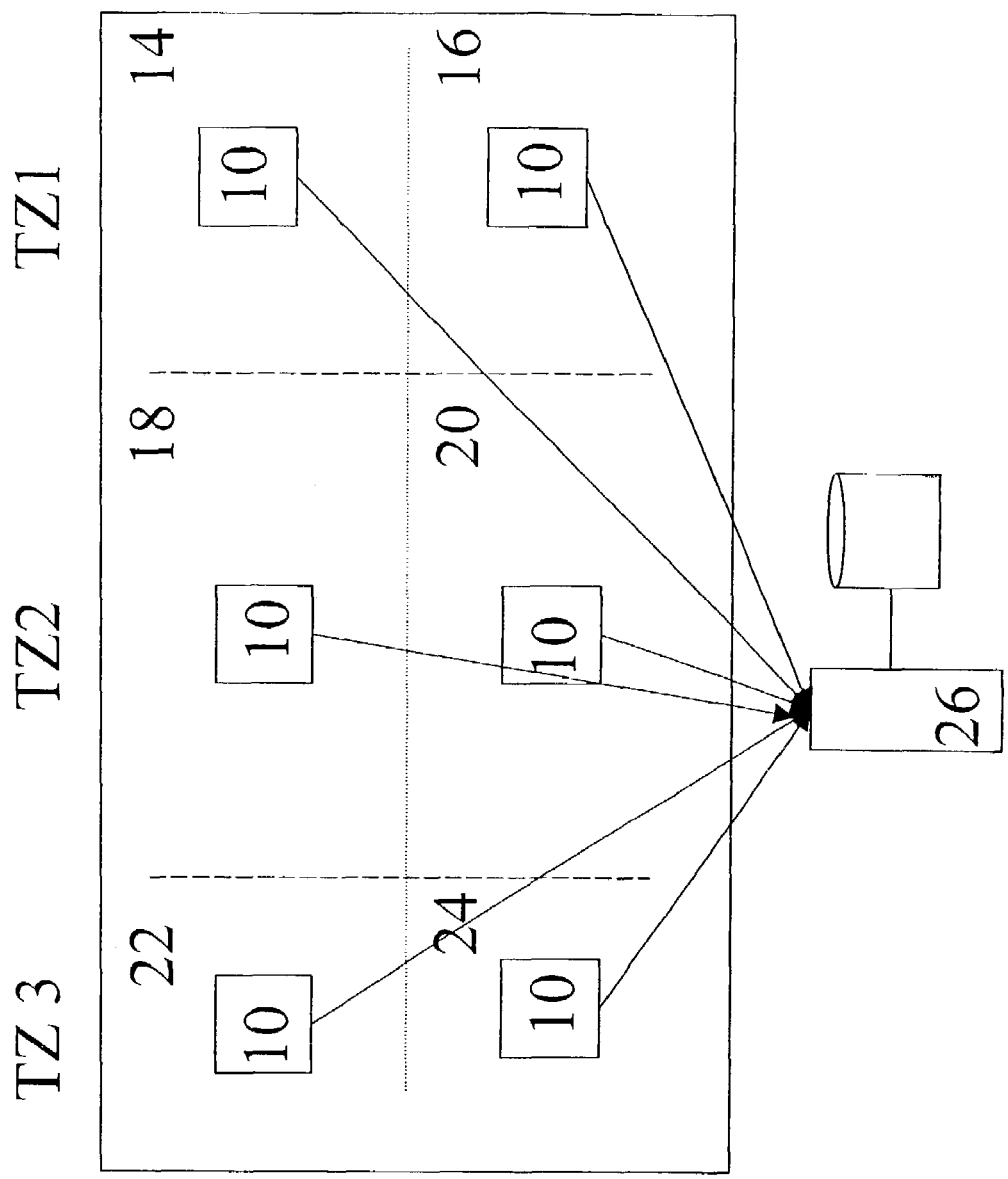
FIG. 2 is a schematic diagram of the system of the present invention.

Referring to FIG. 2, the method and system of the present invention comprises a plurality of electronic detection devices 10 located in various broadcast markets 14, 16, 18, 20, 22, 24 in a plurality of time zones (TZ1, TZ2, TZ3) that are configured to receive and analyze broadcasts on a number of channels of a number of broadcast mediums. Two or more detection devices may receive signals from the same channel in the same market to provide redundancy and fault tolerance, in which case duplicative detection records from redundant detection devices are preferably identified and/or removed later in the process. The detection records are collected on a central processing site 26 for analysis and reporting.

The detection devices detect actual market broadcast instances of encoded broadcast items, such as encoded advertisements, and record information regarding each detected actual market broadcast instance, including a unique code for the device, a unique code for the detection event, and the date, time, channel, duration, and detected code. The detection information is consolidated from the plurality of detection devices and processed, and, as described further below, compared to expected broadcast occurrences specified by the flight information. Typically the following items are provided or can be derived from the reported detections.

DEVICE I.D.
DEVICE CHANNEL
DETECTED CODE
DURATION
LOCAL DATE AND TIME
REPORTED CALL LETTER
MONITORED CHANNEL (e.g., frequency)
MEDIA TYPE Detection information from each detection device is initially enhanced with certain reference information which is placed in the associated records of the detection table. The sources of the reference information used to initially enhance the detection information may include the monitoring device information, the channel information and the local broadcaster information, as well as the detected code, and the date and time of the detection. The values in the CALL LETTER field may be obtained from the split channel table based on the REPORTED CALL LETTER provided by the detection device at the time of detection. The MEDIA TYPE is set based upon whether the device is monitoring TV or Radio. The AGENCY ISCI CODE is obtained by performing a lookup in the encoded advertisement table using the DETECTED CODE. After initial enhancement, the following fields of the detection table are generally populated:

INITIALLY ENHANCED DETECTION TABLE
   DEVICE I.D.
   DETECTION I.D.
   DETECTED CODE
   DURATION
   LOCAL DATE AND TIME
   REPORTED CALL LETTER
   CALL LETTER (may differ if split channel condition)
   DEVICE MARKET
   BROADCAST MARKET
   MEDIA TYPE (TV or Radio)
   AGENCY ISCI CODE
   MARKET COMMON ROW The DEVICE MARKET is obtained from the monitoring device table using the DEVICE I.D. The BROADCAST MARKET is obtained from the station table using the CALL LETTER.

Then, the detection information is enhanced further with the program schedule information. By enriching the detection with schedule information the system does not need to maintain a large historical record of broadcast schedules. Only the current schedule needs to be in the system. Essentially this table provides a permanent record of what was playing when the detection was heard. Information is stored in an enhanced detection with schedule table, described below:

ENHANCED DETECTION WITH SCHEDULE TABLE
   DETECTION I.D.
   CALL LETTER
   STATION TYPE
   NATIONAL CALL LETTER
   DISTRIBUTOR
   BROADCAST MARKET
   LOCAL DATE AND TIME
   SCHEDULED PROGRAM NAME
   SCHEDULE ADJUSTMENT
   SCHEDULE ADJUSTED DATE AND TIME
   BASE TIME ZONE ADJUSTMENT
   BASE TIME ZONE ADJUSTED DATE AND TIME

The table is populated by a process performing a series of look ups, and time calculations based upon the adjustment values found in the schedule information tables. First the Detected CODE, CALLLETTER, MEDIA TYPE, LOCAL BROADCAST MARKET, LOCAL DATE AND TIME are brought over from the Initially Enhanced Detection table If the system is processing a cable station, the system looks up the ADJUSTMENT and FEED values from the National Cable Adjustment Table for that BROADCAST MARKET, CALLLETTER for the corresponding SEASONAL value. That adjustment value is applied to LOCAL DATE AND TIME and the result is stored in a temporary datetime field. The system then performs a look up in the schedule table to determine what was playing on that National Cable network for the corresponding temporary datetime and national cable network and appropriate feed.

If the system is working on a Broadcast detection, the individual schedule locally adjusted for that station is already in place in the schedule table. The system simply copies the LOCAL DATE AND TIME into the temporary field and it then performs a look up in the schedule table to determine what was playing at that time on that CALLLETTER.

Once the system has the corresponding schedule entry from the schedule table, the remaining fields are populated as follows. The system then takes PROGRAM NAME from the schedule table and places it in the SCHEDULED PROGRAM NAME in the detection record. The NATIONAL CALLLETTER and DISTRIBUTOR are also copied from the schedule table to the corresponding fields in the detection record. The pre-calculated schedule adjustment value from the schedule table is preferably multiplied by −1 and is applied to the temporary datetime field, which is then placed in to the SCHEDULE ADJUSTED DATE AND TIME field. The resulting sum of adjustments (if any) which were used to adjust the time is stored in the SCHEDULE ADJUSTMENT field. Preferably, the record is also enhanced with an adjustment to relate the local date and time to the base time zone (in absolute terms.) Specifically, a corresponding adjustment can be placed in a BASE TIME ZONE ADJUSTMENT field and the corresponding date and time can be placed in a BASE TIME ZONE ADJUSTED DATE AND TIME field. These may be calculated using the geographic location of the monitoring device (e.g., the DEVICE MARKET), the LOCAL DATE and the LOCAL TIME, provided the time difference between the location and the time zone of the base market is known.

The detection information is also enhanced with the encoded advertisements information and the agency commercial information. Specifically, the DETECTED CODE of each detection record is used to perform a look-up in the encoded advertisements table to obtain the associated AGENCY ISCI CODE, which may be placed in an AGENCY ISCI CODE field in the associated detection record. In addition, the MULTI-MARKET BROADCAST associated with the AGENCY ISCI CODE is obtained from the encoded advertisement table with a look-up based on the AGENCY ISCI CODE. The AGENGY and CLIENT associated with the AGENCY ISCI CODE may be obtained from the agency commercial table with a look-up based on the AGENCY ISCI CODE and LOCAL DATE.

Once the enhanced detection schedule record has been completed, the system undertakes a process to review all the new records and to generate a detection table having all of the unique detections within a given market. The system identifies redundant detections within the same market having the same call letter and time. Redundant detections may be linked together with a common MARKET COMMON ROW value, or the redundant detection records can be deleted. Then, the system builds a processed detection table having a detection record for each unique MARKET COMMON ROW, which record contains a combination of all the data associated with the detection. The processed detection record is described below.

PROCESSED DETECTION TABLE
DETECTION I.D.
ISCI CODE
MULTIPLE-MARKET BROADCAST
CALL LETTER
NATIONAL CALL LETTER
DISTRIBUTOR
AGENCY
CLIENT
DEVICE MARKET
BROADCAST MARKET
DETECTED DURATION
DEVICE I.D.
SCHEDULED PROGRAM NAME
DAY PART
TIME ZONE
STATION TYPE
MEDIA TYPE
FLIGHT ROW
NATIONAL COMMON ROW
NATIONAL MARKET COUNT
NATIONAL MARKET MINIMUM
LOCAL DATE AND TIME
SCHEDULE ADJUSTED DATE AND TIME
BASE TIME ZONE ADJUSTED DATE AND TIME
BROADCAST DAY DETECTED DATE AND TIME

The record is built from information contained in previously discussed tables, and some additional enrichment from other reference tables.

The following fields are populated from the corresponding record in the initially enhanced detection table: DETECTION I.D., AGENCY ISCI CODE, DEVICE MARKET, DURATION, DEVICE I.D., MEDIA TYPE.

The following fields are populated from the enhanced detections with schedule table: CALL LETTER, DISTRIBUTOR, NATIONAL CALL LETTER (from DISTRIBUTOR), SCHEDULED PROGRAM NAME, LOCAL DATE AND TIME, SCHEDULE ADJUSTED DATE AND TIME, LIVE EVENT ADJUSTED DATE AND TIME, TYPE OF STATION.

The AGENCY, CLIENT combination is obtained from the agency commercial table using the AGENCY ISCI CODE, LOCAL DATE of the detection. The BROADCAST MARKET comes from a lookup in the station table using the CALL LETTER.

The TIME ZONE is from a lookup on the location of the monitoring device. The FLIGHT ROW is initially set to a predetermined value (e.g., -1) to indicate it has not been associated with any flight records. The NATIONAL MARKET COUNT and NATIONAL MARKET MINIMUM are initially set to zero. The NATIONAL COMMON ROW is initially set to a first predetermined value (e.g., -1) if the commercial is intended to be national in scope, or a second predetermined value (e.g., -2) if it is local. The MULTIPLE-MARKET BROADCAST is obtained from a lookup in the encoded commercial table using the AGENCY ISCI CODE. The detection is further enriched with a day part label by looking up the DAY PART (e.g., MORNING, DAYTIME, PRIMETIME, EVENING, LATE, OVERNIGHT) to which this detection corresponds. This information may be held in a day part reference table.

The detection information is also compared to the broadcast day information to determine whether the actual detection date should be adjusted to correspond with the associated broadcast day. Specifically, the LOCAL DATE AND TIME of each detection record is compared to the CUT-OFF TIME of the record in the broadcast day table having the same AGENCY+CLIENT combination as the detection record. If the LOCAL TIME of the detection record is less than the CUT-OFF TIME of the matching broadcast day record, then BROADCAST DAY DETECTED DATE AND TIME is set to one day less than the LOCAL DATE AND TIME, otherwise it is set to equal the LOCAL DATE AND TIME.

Step 6—Associate Related National Detection Records

Multiple attempts are made to associate national detections together. These associations normally correspond to the program schedule, on occasion they correspond to a live event, which may go beyond a schedule time. For example, a World Series game may go into extra innings, or a regional football game may run later than its counterparts. As a result the system makes multiple attempts using different criteria to associate national detections together.

Review of Markets in Time Zone of Base Market Using the Schedule Method

The first attempt to associate national detections together uses the schedule basis and reviews only the detections of national commercials in the time zone of the base market. In this attempt, records of the processed detections table are compared to one another to determine if they are related to the same broadcast. Related market detection records are associated with an anchor detection record in the processed detections table, which may be a discrete "synthetic" record or which may be a designated one of the actual detection records. Specifically, each detection record related to a multi-market advertisement, which detection is from a market in the time zone of a predefined base broadcast market (e.g., NY), is reviewed to see if a matching anchor detection record already exists for the compared detection record.

As set forth above, a multi-market detection record is one that has an AGENCY ISCI CODE which matches a record in the encoded advertisements table that has a MULTI-MARKET BROADCAST value indicating that the advertisement associated with the AGENCY ISCI CODE is intended for a multi-market advertising campaign or order (e.g., with a value of "Y" or "NATL"). Preferably, each record in the processed detections table includes a MULTIPLE-MARKET BROADCAST field which indicates the intended scope of the related advertisement.

A multi-market detection record is associated to an anchor detection record if the two records have the same AGENCY, ISCI CODE, DISTRIBUTOR and SCHEDULE ADJUSTED DATE AND TIME.

Additionally, a correlation between an actual detection record and an anchor detection record is preferably made if the SCHEDULE ADJUSTED DATE AND TIME of the actual detection record is within a predetermined first association time window. The first association window is typically two minutes. However, the size of the window is preferably adjustable by the system administrator. That is, a predetermined variance is allowed such that an exact date/time match is not required. However, preferably, if more than one actual detection record is within the time window, the actual detection record most closely matching the anchor detection record is chosen.

If a correlation with an anchor detection record is found, then all of the actual detection records associated with that anchor detection record, if any, are reviewed to see if another actual detection record having the same BROADCAST MARKET as the compared detection record has already been associated with the anchor detection record. If no such other detection record has been associated with the anchor detection record, then the compared detection record is associated with the anchor detection record. Such an association can be created by placing the DETECTION I.D. of the anchor detection record in a NATIONAL COMMON ROW field in the compared record, or by any other suitable method of creating an association.

When a detection record is associated with an anchor detection record, a NATIONAL MARKET COUNT field of the anchor detection record is preferably incremented by 1. As can be appreciated, the NATIONAL MARKET COUNT field holds a value equal to the number of individual detection records associated with the anchor detection record.

If a corresponding anchor detection record is not found for the compared actual detection record, then a new anchor detection record is created (with a MARKET COUNT of 1) and the compared detection record is associated with the new anchor record, as described above.

Preferably, each anchor detection record is essentially a copy of the actual detection record which spawned the generation of the new anchor record, with the following exceptions The CALLLETTER field of the anchor record takes the value of either the NATIONALCALLLETTER value or the DISTRIBUTOR value of the actual detection record, depending on the run criteria of the generate national record. (the schedule method uses the DISTRIBUTOR, the network method uses the NATIONAL_CALLLETTER value).

The BROADCAST MARKET field of the anchor record has a distinguishing value in a predetermined field in the record, such as the BROADCAST MARKET field. The distinguishing value can be "Anchor", "National" or "NATL", or some other predetermined distinguishing value.

The BROADCAST DAY DETECTED DATE AND TIME may be adjusted if the source is from a cable channel and the Anchor record is from a non base market. The adjustment value from the National Cable Adjustment Table will be applied to the actual detection time of this market record.

The DETECTION I.D. of the synthetic National record is unique.

First Purge of Non-qualified Anchor Records

Once the markets in the base time zone have been reviewed and like records with similar times have been associated, the system looks to remove weak anchor records. The NATIONAL MARKET COUNT value of each anchor detection record is compared to a predetermined minimum value. If the NATIONAL MARKET COUNT value of an anchor detection record is less than the predetermined minimum value and the anchor detection record is not associated with a record in the flight information table (as discussed below), the anchor detection record is considered to be non-qualified and the associations between the associated actual detection records and the anchor record are eliminated (e.g., by clearing the NATIONAL COMMON ROW field of the actual detection records). Further, if the non-qualified anchor detection record is a discrete record, the anchor detection record is deleted from the processed detections table.

Review of All Markets Using Schedule Method; No Creation of Anchor Records

Once all non-qualified records have been purged, the system attempts to review all markets in all time zones, usually with a second time window. The second time window is preferably larger than the first association time window discussed above. However, the size of the second time window is preferably adjustable. This pass attempts to associate actual detection records to existing (qualified) national records using the SCHEDULE ADJUSTED DATE AND TIME as before. As with the earlier pass, unassociated actual multi-market detection records from each market are compared to the existing anchor detection records to determine if the actual detection records are related to an existing anchor detection record. As above, a correlation is found when the actual detection record and the anchor market detection record share the same AGENCY ISCI CODE, DISTRIBUTOR and SCHEDULE ADJUSTED DATE AND TIME from the schedule, as described above. However, preferably the secondary association time window greater than the initial association time window (i.e., a larger variance) is allowed. If a correlation is found, the NATIONAL COMMON ROW and MARKET COUNT fields are updated accordingly in the actual detection and anchor records respectively.

Review of All Market Using Network Method Generate National Anchors

The system next attempts to associate the remaining unassociated actual multi-market detection records using the Network method. The Network Method will look to see if these items correspond to a Live event running out-of-schedule on the network affiliates. In this step, the system compares the NATIONAL CALL LETTER and the BASE TIME-ZONE ADJUSTED DATE AND TIME fields of the anchor record to the NATIONAL CALL LETTER and BASE TIME-ZONE ADJUSTED DATE AND TIME fields of the actual detection record. As before, the system looks to associate unassigned market records with national records which have not had that market associated with it.

As with the first matching attempt, an anchor detection record will be generated if a match is not found with an existing anchor detection record. The time window used for this pass is typically about two minutes. As above, if a match is found, the NATIONAL COMMON ROW and NATIONAL MARKET COUNT fields are updated accordingly in the corresponding records. If a match is not found the method will build an national record from this market, and use it along with the other national records, in the compares with remaining unassociated market records.

Second Purge of Non-qualified National Records

The system having attempted to build national records using the schedule method and then the network then purges will now purge all non-qualified national records as described above.

Review of All Markets Using Schedule Method and Large Time Window; Generate Anchor Records This step runs just like the first, with a larger system administration controlled time window. Further, that all markets are reviewed and allowed to generate national records using the Adjusted Schedule Time.

The result of the process of associating related market detections is a processed detection table having four types of records: (1) qualified synthetic anchor detection records associated to at least the predetermined minimum number of actual detection records with the BROADCAST MARKET="NATL", (2) unqualified synthetic anchor detection records associated to less then the minimum number of actual detection records with the BROADCAST MARKET="NATL", (3) actual detection records associated with anchor detection records of Type 1 or 2, and (4) actual detection records not associated with anchor detection records. The records of Type (2) may be considered "local anomalies" of detections of multi-market advertisements. The records of Type (4) are detections of single-market or "spot" advertisements.

Step 7—Associating Detections to Flights

Associating Detections to Flights

As described above, the flight information may be either national in scope (i.e., multi-market) or focused on a specific (single) market. As a result the CALL LETTER and BROADCAST MARKET fields have been set accordingly and indicate whether the record is related to a multi-market or single-market advertising order. For example, a record for a national flight could have the CALL LETTER "ABC" and "NATL" as the BROADCAST MARKET. On the other hand, if the flight is focused on the New York market, the CALL LETTER could be "WABC" and the BROADCAST MARKET could be "NY."

On the detection record side, the anchor detection records (e.g., with a BROADCAST MARKET of "NATL" (either Type 1 or 2 from above) have been generated from the individual actual detection records for multi-market (e.g., national) advertisements. The anchor detection records are either qualified or non-qualified (i.e., "local anomalies"). In either case, the individual actual detection records for the multi-market advertisements (Type 3 from above) have been associated to an anchor detection record and to themselves via a common value in the NATIONAL COMMON ROW field. The type 4 actual detection records are single-market (i.e., non-national) market records.

Direct Match

Previously unassociated (or unmatched) qualified anchor detection records (Type 1) and single-market actual detection records (Type 4) are compared with unassociated (unmatched) multi-market flight information table records and single-market flight information table records, respectively. As described above, the flight information table records relate to line item details in the buy information.

The system checks each unassociated flight record to see if a corresponding unassociated detection record exists which completely satisfies the criteria of the flight record. A detection record will completely satisfy the criteria of the flight record when: (1) the AGENCY, CLIENT, BROADCAST MARKET, CALL LETTER and DURATION/ LENGTH OF SPOT fields of the detection and flight records are the same (2) the ISCI CODE of the detection record is within the ISCI GROUP of the flight record, (3) the BROADCAST DAY DETECTED DATE AND TIME of the detection is within the START and END dates of the FLIGHT record, (4) the day of the week of the detection record matches an allowable day of the week of the flight record (i.e., one of the MONDAY, TUESDAY, WEDNESDAY, THURSDAY, FRIDAY, SATURDAY or SUNDAY fields), and (5) the LOCAL TIME of the detection record is within the START TIME and END TIME of the flight record. Further, if the records being compared are related to a syndicated program, the SCHEDULED PROGRAM NAME fields of the detection record and the flight record must match.

When a match is found, the flight and detections records are updated to associate each with the other. Specifically, the DETECTION I.D. field of the flight record is updated to contain the DETECTION I.D. of the corresponding detection record, and the FLIGHT ROW field of the detection record is updated to contain the row (e.g., record number) of the corresponding flight record. Furthermore, if the detection record is an anchor detection record, then the FLIGHT ROW fields of all of the actual detection records associated with the anchor detection record (i.e., all which share the same NATIONAL COMMON ROW value) are updated to contain the row of the corresponding flight record. As described below, these associations allows for detailed (drill-down) reporting, and takes the associated records out of the pool of unassociated records.

In addition, a FLIGHT MATCHED field of the flight record may be set (e.g., to "1" or "YES") to indicate that the flight is associated with a detection record.

Preferably, flight records are compared in a predetermined order to optimize matching accuracy. For example, prior to or during matching, the flight records may be sorted. Primarily, the flight records may be sorted by a time window specified in the fight record, which may be held in a TIME WINDOW field in the flight record. The time window is the difference between the FROM TIME and the TO TIME of the flight record. Secondarily, the flight records may be sorted by the size of the ISCI GROUP, which may be ascertained by determining the length of the field (i.e., the number of characters), or by any other suitable manner. A tertiary sort of the flight records may be made based on the ITEM NUMBER field, where 1 of N would precede N of N.

Secondary Comparisons

Once the direct matching step discussed above has been performed, a series of secondary comparisons are made for imprecise matches with various parameters. These secondary comparisons are set forth in a preferred order, however it can be appreciated that other orders may be suitable. As above, in the secondary comparisons, previously unassociated (or unmatched) qualified anchor detection records (Type 1) and single-market actual detection records (Type 4) are compared with unassociated (unmatched) multi-market flight information table records and single-market flight information table records, respectively.

Match With a Primary Time Allowance

In one secondary comparison, detection records are compared to unassociated flight records in a manner similar to the manner described above with respect to direct matches. However, in this instance, a predetermined primary time allowance is provided, which has the effect of decreasing the FROM TIME and increasing the TO TIME of the flight record by the primary time allowance. For this comparison, the FROM ALLOWANCE and TO ALLOWANCE fields of the flight record may be employed.

If a match is found in this comparison, the detection record and flight record are associated to one another as described above and counts are adjusted to indicate the match. A match made during use of the secondary comparisons may be considered a match with a discrepancy, and a DISCREPANCY CODE may be added to the flight record. Suitable discrepancy codes for each type of secondary comparison are discussed in detail below.

Match with Wrong ISCI Same duration

Another secondary comparison can be made in the same manner as described above with respect to a direct match, however, in this instance, a match is made even if the ISCI CODE of the detection record is not within the ISCI GROUP of the flight record, but is of the same AGENCY and CLIENT, and the DURATION of the detection record matches the LENGTH OF SPOT of the flight record.

If a match is found in this comparison, the detection record and flight record are associated to one another as described above and counts are adjusted to indicate the match.

Match with Wrong ISCI of Wrong Duration

Another secondary comparison can be made in the same manner as described above with respect to a match with a wrong ISCI code, however, in this instance, a match is made if the ISCI CODE of the detection record is not within the ISCI GROUP of the flight record and the DURATION of the detection record is not the same as the DURATION of the flight record.

If a match is found in this comparison, the detection record and flight record are associated to one another as described above and counts are adjusted to indicate the match.

Match with an Extra Spot

In another secondary comparison, detection records are compared to flight records to determine whether the detection record matches a flight record wherein the ITEM NUMBER field of the flight record has the form N of N (e.g., 3 of 3) and the flight record has already been associated with a detection record, which indicates that all the units of the line item of the buy information related to the flight record have already been satisfied. Specifically, detection records are compared to flight records in a manner similar to the direct comparison described above; however, the comparison is made to flight records that have already been associated with a detection record. Further, a match is made if all of the comparisons made with respect to a direct match are true and ITEM NUMBER field of the flight record has the form N of N. In this instance, a match is made with an extra spot.

If an extra spot match is made, then a new flight record is created with the same information as the matched flight record, however a value of "N+1 of N" (e.g., 4 of 3) is placed in the ITEM NUMBER field of the new flight record, to indicate that this is an extra spot. The matching anchor detection record and new flight record are associated to one another.

Match with an Extra Spot using the Primary Time Allowance

Another secondary comparison can be made in the same manner as described with respect to the match with an extra spot, however, in this instance, the predetermined primary time allowance, as described above is permitted.

If a match is found in this comparison, the detection record and flight record are associated to one another as described above and counts are adjusted to indicate the match.

Match with a Secondary Time Allowance

Another secondary comparison can be made in the same manner as described with respect to the primary time allowance, with a secondary time allowance greater than the first.

If a match is found in this comparison, the detection record and flight record are associated to one another as described above and counts are adjusted to indicate the match.

Match with Wrong ISCI in an Extra Spot

Another secondary comparison can be made in the same manner as described above with respect to a match with an extra spot, however, in this instance a match is made even if the ISCI CODE of the detection record is not within the ISCI GROUP of the flight record.

If a match is found in this comparison, the detection record and flight record are associated to one another as described above and counts are adjusted to indicate the match.

Match with Wrong ISCI of Wrong Duration in an Extra Spot

Another secondary comparison can be made in the same manner as described above with respect to a match with an extra spot, however, in this instance a match is made even if the ISCI CODE of the detection record is not within the ISCI GROUP of the flight record and the DURATION of the detection record is not the same as the LENGTH OF SPOT of the flight record.

If a match is found in this comparison, the detection record and flight record are associated to one another as described above and counts are adjusted to indicate the match.

Discrepancies

As stated above, a match made during one of the secondary comparisons may be considered a match with a discrepancy. A discrepancy name and/or code may be placed in the flight record to indicate the type of discrepancy. In particular, DISCREPANCY NAME and DISCREPANCY CODE fields of the flight record may be set as follows:

| DISCREPANCY NAME | DISCREPANCY CODE |
| --- | --- |
| Match with primary time allowance | WITHIN ALLOW |
| Wrong ISCI | WC |
| Wrong ISCI, wrong duration | WC DiffLen |
| Extra spot | EXTRA SPOT |
| Extra spot, primary allowance | EXTRA SPOT |
| Secondary time allowance | OUTSIDE ALLOW |
| Wrong ISCI, extra spot | WC EXTRA |
| Wrong ISCI, wrong duration | WC DiffLenExtra |

Step 8—Custom Viewing and Reporting

The result of the detection and matching process is a series of tables which may be queried to produce reports as to fulfilled, unfulfilled and partially fulfilled (erroneous) broadcast orders.

Referring to FIGS. 3–11, the system provides summary and detailed reports on fulfilled and unfulfilled orders, as well as certain types of erroneously fulfilled orders, such as extra spots and wrong advertisements (i.e., wrong creative). The mutual, multiple associations between the flight records and the related detection records, and the associations between anchor detection records and related actual detection records provides the ability to obtain detailed information as to the bases for the reports. Preferably, the reports include links, such as "View Details" and "Drill Down" that display underlying information in increasing detail.

Figure 3:
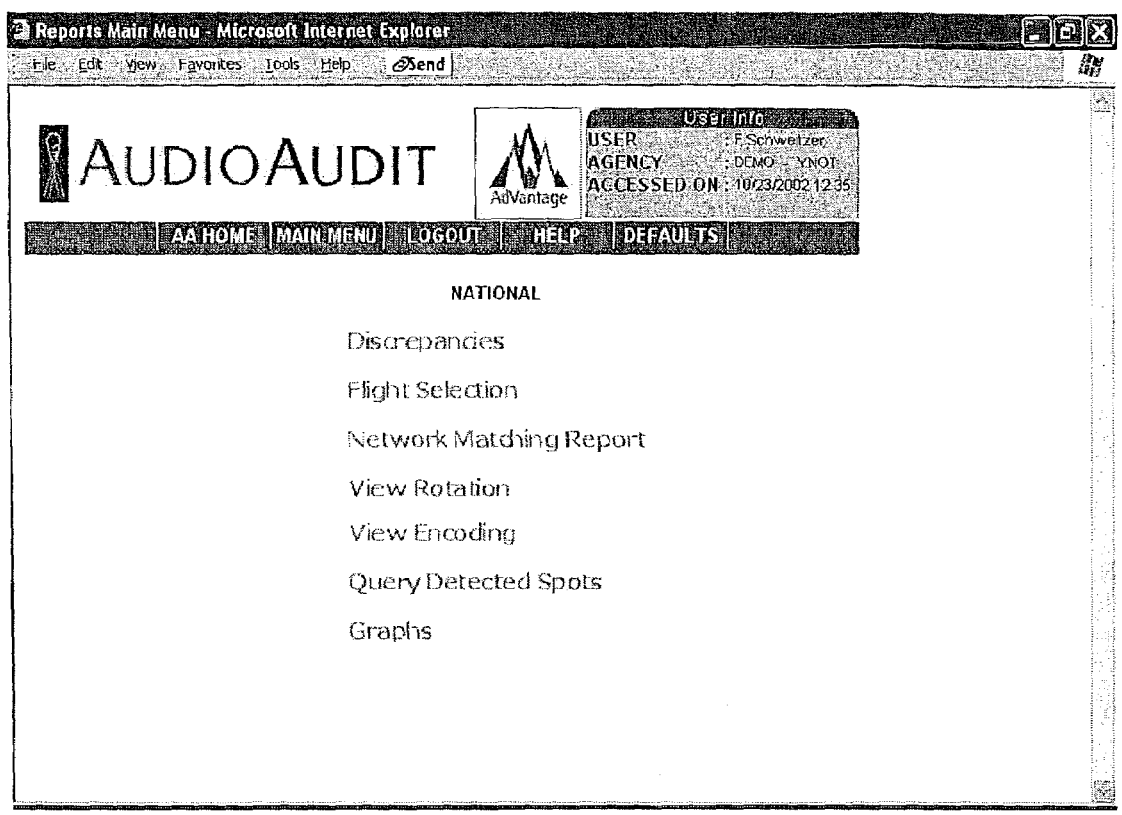
Figure 4:
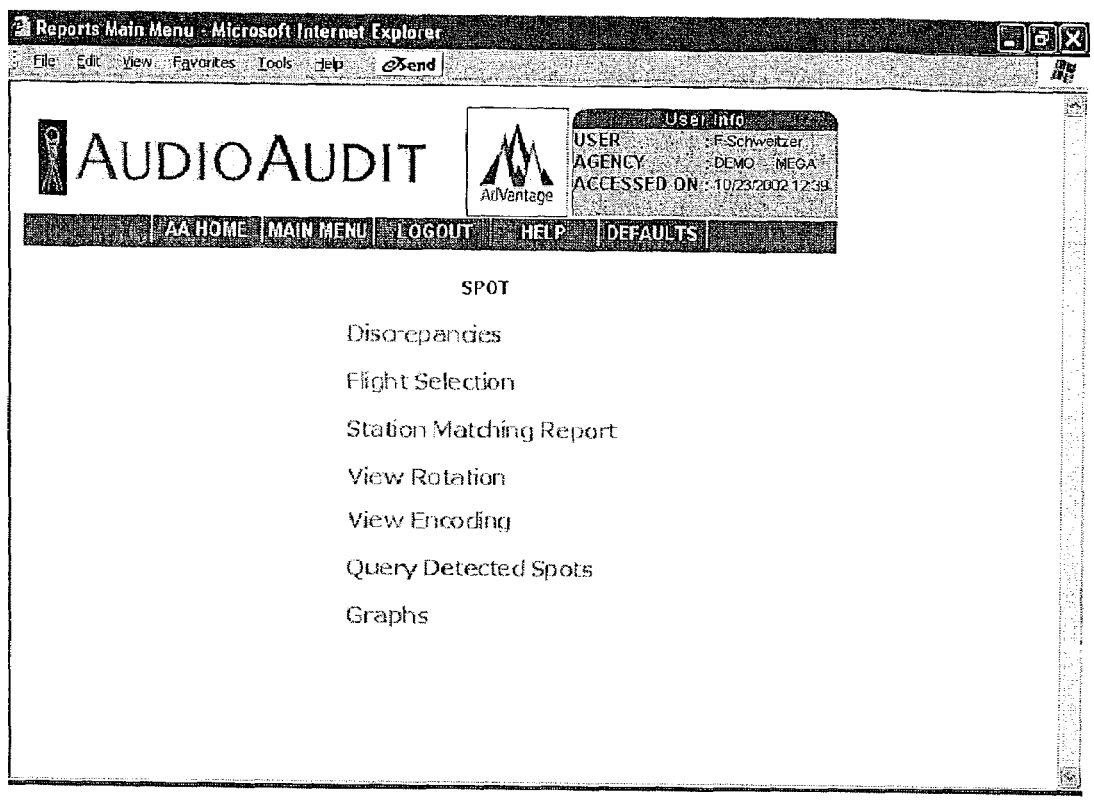

Referring to FIGS. 3 and 4, main screens provide various methods to query information on multi-market (e.g., national) and single-market advertising orders, respectively. Preferably, prior to producing this screen, the user has chosen a particular agency and client combination to query.

Figure 5:
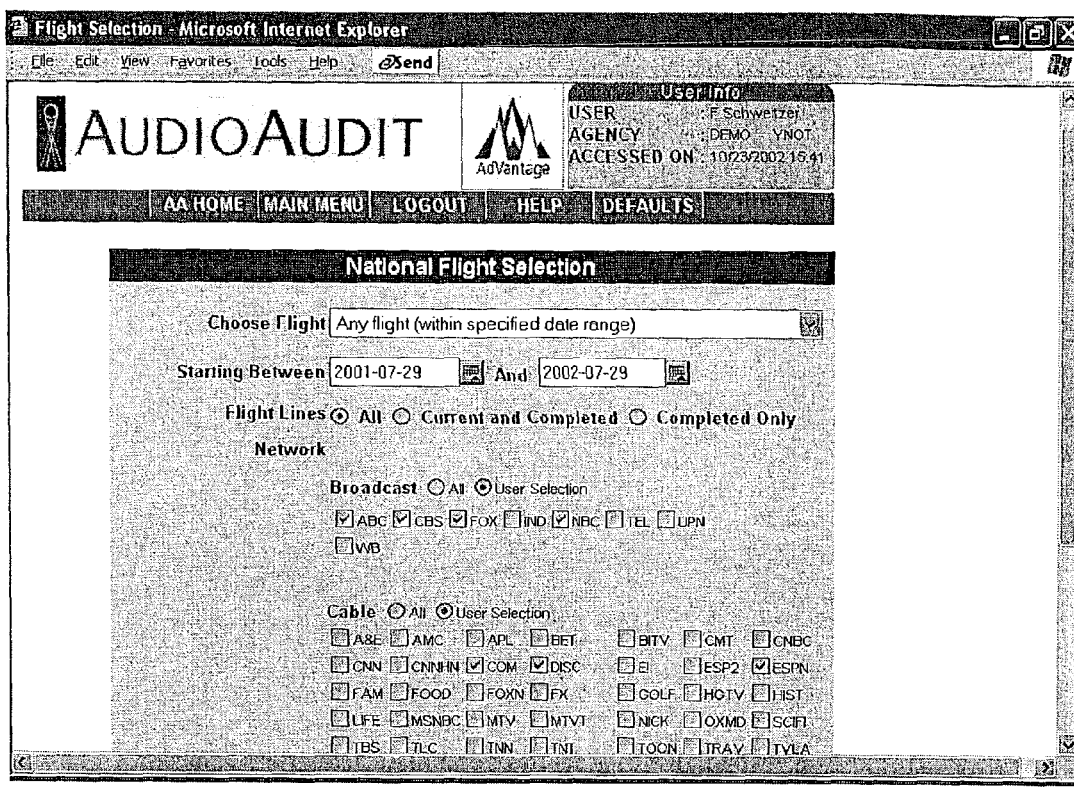

Referring to FIG. 5, a selection screen related to national flight selections provides a means to enter search criteria for obtaining information on specific flight orders, such as the date range and the network.

Figure 6:
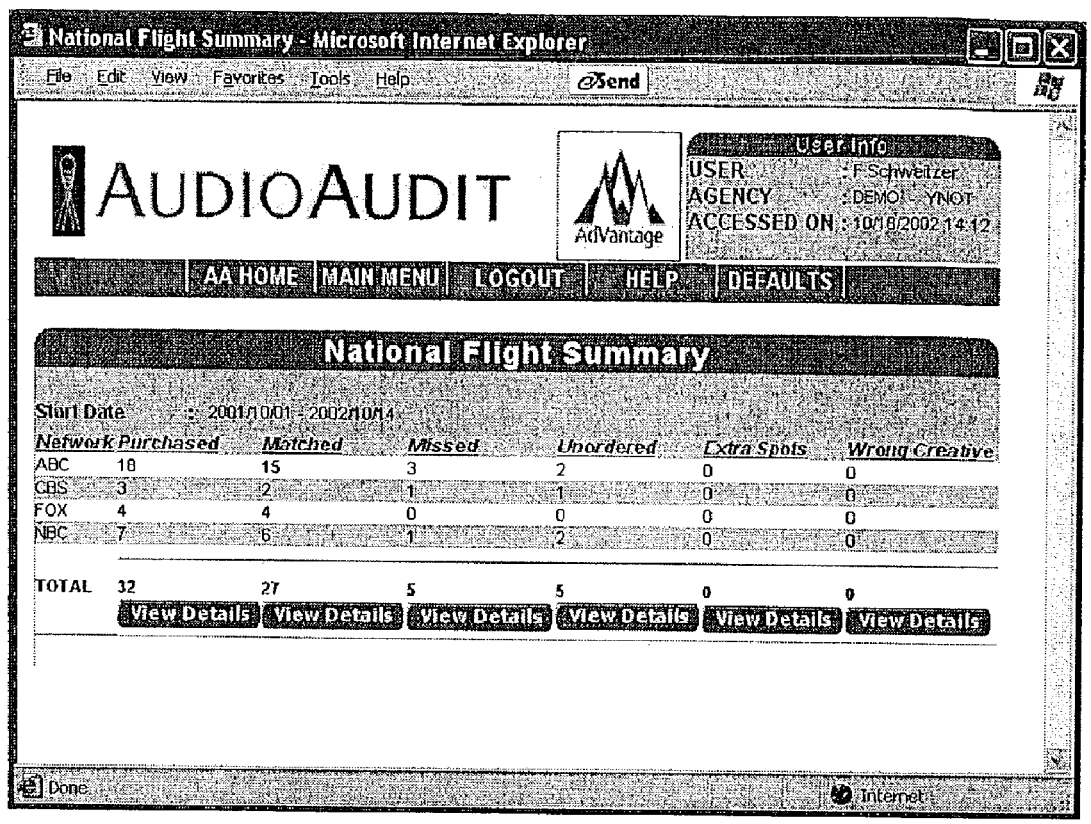

Referring to FIG. 6 search criteria entered in the selection screen of FIG. 5 will produce a National Flight Summary screen which provides summary information regarding the flight within the search criteria. The summary information includes the total number of spots purchased, matched, missed, unordered, extra spots, and wrong creative (i.e., wrong ISCI).

Referring to FIG. 7, selecting the "View Details" button, under the "Purchased" column of the National Flight Summary (FIG. 6) will produce a report of certain details regarding the flight information. This report provides details regarding the spots purchased with the flights display in FIG. 6.

Figure 8:
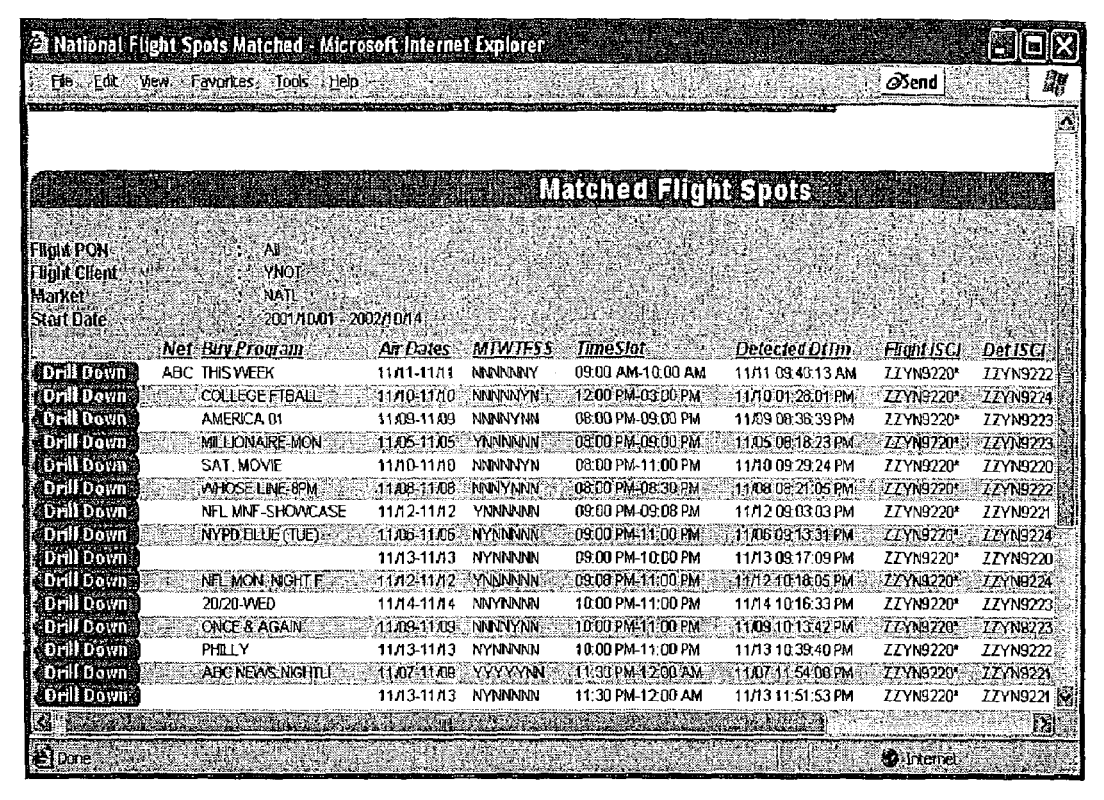

Referring to FIG. 8, selecting the "View Details" button under the "Matched" column of the National Flight Summary (FIG. 6) will produce a report of certain details regarding matched flight information. This report provides details on the anchor detections associated with the flights displayed in FIG. 6.

Figure 9:

Referring to FIG. 9, further details regarding the actual market detections that are associated with such anchor market detections is available by selecting the associated "Drill Down" button in the report of FIG. 8, which action produces the report of FIG. 9. The report of FIG. 9 provides detailed information regarding individual actual market detections that comprise the associated anchor market detection.

Figure 10:

Referring to FIG. 10, the system also provides reports regarding the rotation of certain advertisements, based on the ISCI CODE.

Figure 11:
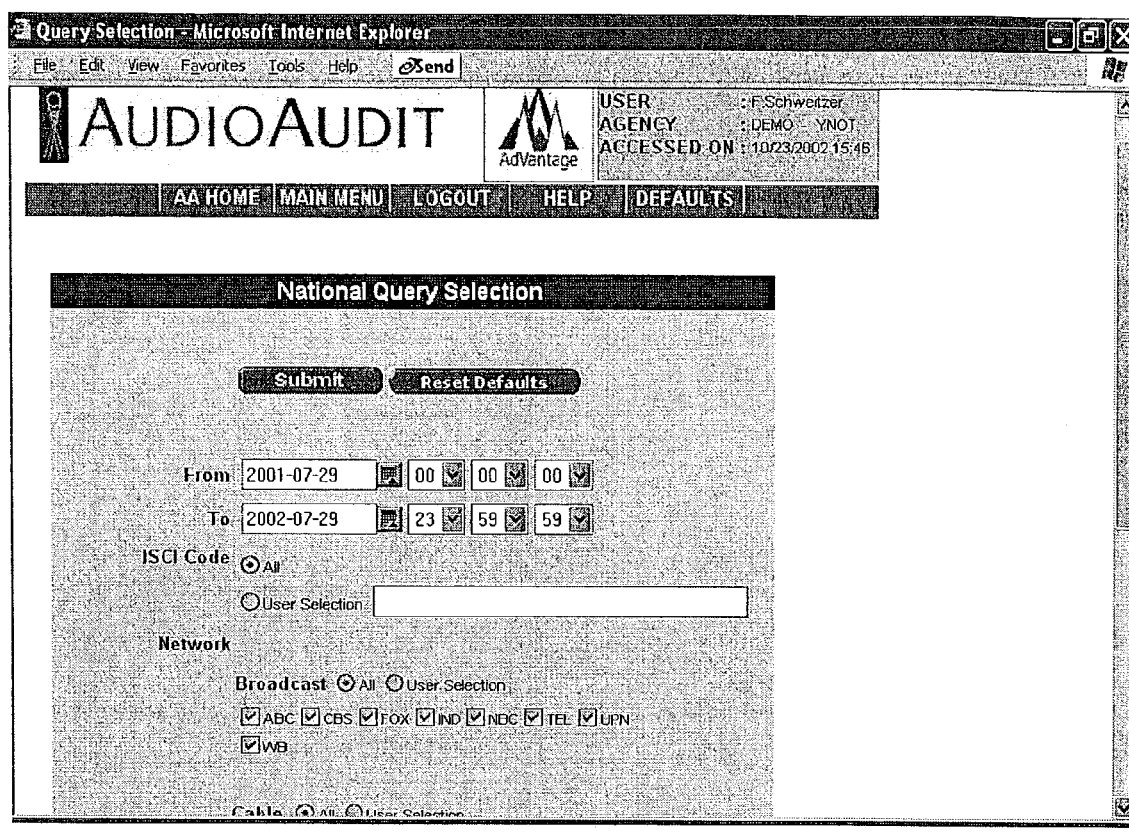

Referring to FIG. 11, the system also provides the user with the ability to perform ad hoc queries of the detection records based on, for example, the date range, ISCI code(s), and call letters.

Therefore, as can be appreciated the present invention provides a method and system for tracking, managing multi-market broadcast advertising that provide accurate, independent confirmations of the fulfillment of broadcast advertising orders, that provide significant advantages in matching multi-market broadcasts of advertisements to multi-market advertising orders, that provide significant advantages in reporting of fulfilled and unfulfilled orders and that provide such matching, confirmation and reporting for a large number of broadcasts over a large number of broadcast markets.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A method of analyzing multi-market broadcasts of commercial advertisements, comprising:

assigning unique identifiers to a plurality of expected commercial advertisements;

recording information regarding said plurality of expected commercial advertisements and said respective unique identifiers in a computer database;

comparing published broadcast schedules from a plurality of broadcast markets including a base market each broadcast schedule comprising a plurality of broadcast items;

determining time adjustments between (a) broadcast times of program items from said plurality of said broadcast schedules and (b) a broadcast time of an associated broadcast item in said broadcast schedule of said base market;

recording said time adjustment for each of said broadcast items from said plurality of broadcast schedules in said broadcast schedules associated with a related broadcast item;

receiving electronic detections of a plurality of actual market-broadcast instances of a commercial advertisement, said plurality of actual market-broadcast instances comprising a plurality of broadcast markets;

recording information regarding said detections in a computer database;

said step of recording information regarding detections of actual market-broadcast instances of said commercial advertisement comprises:

using said broadcast schedules to identify a broadcast item scheduled for broadcast during a time and date of said detection;

retrieving time adjustment associated with said identified broadcast item; and recording said retrieved time adjustment in database associated with said detection;

associating related ones of said plurality of actual market-broadcast instances of said commercial advertisement in a computer database, said related ones of said actual market-broadcast instances comprising a plurality of broadcast markets;

said step of associating related ones of said plurality of actual market-broadcast instances of commercial advertisements comprises comparing said plurality of actual market-broadcast instances of commercial advertisements to one another using said recorded time adjustments;

recording information regarding a plurality of multi-market broadcast orders of commercial advertisements in a computer database;

comparing detections from broadcast markets in a time zone of said base market to anchor detection records of said base market using an associated time adjustment;

associating said detections from broadcast markets in said time zone of said base market to related anchor detection records of said base market;

after comparing detections from broadcast markets in said time zone of said base market to said anchor detection records of said base market:

comparing detections from other broadcast markets to said anchor detection records, using an associated time adjustment, and associating said detections from other broadcast markets to related anchor detection records;

associating related ones of said actual market-broadcast instances of said commercial advertisement with a related multi-market broadcast order for said commercial advertisement in a computer database, said multi-market broadcast order comprising said plurality of broadcast markets.

2. A method of analyzing multi-market broadcasts of commercial advertisements, as in claim 1, further comprising:

during said comparison of detections from broadcast markets in said time zone of said base market to anchor detection records of said base market, creating a new anchor detection record for an unmatched detection if no association is made between said unmatched detection and an existing anchor detection record.

3. A method of analyzing multi-market broadcasts of commercial advertisements, as in claim 2, further comprising:
during said comparison of detections from broadcast markets in said time zone of said base market to anchor detection records of said base market, matching being performed according to a schedule method wherein a criteria is a common distributor.

4. A method of analyzing multi-market broadcasts of commercial advertisements, as in claim 3, further comprising:
after said comparison of detections from broadcast markets in said time zone of said base market to anchor detection records of said base market, performing a first purge of anchor detections that are associated with less than a predetermined minimum number of detections.

5. A method of analyzing multi-market broadcasts of commercial advertisements, as in claim 4, further comprising, after said first purge:
comparing detections from all broadcast markets to anchor detections, using an associated time adjustment, and associating said detections from all broadcast markets to related anchor detection records; and
matching being performed according to a schedule method wherein a criteria is a common distributor.

6. A method of analyzing multi-market broadcasts of commercial advertisements, as in claim 5, wherein
after said steps of comparing and matching subsequent to said first purge, performing a second purge of anchor detection records that are associated with less than a predetermined number of detections.

7. A method of analyzing multi-market broadcasts of commercial advertisements, as in claim 6, further comprising, after said second purge:
comparing detections from all broadcast markets to anchor detection records, using an associated time adjustment, and associating said detections from all broadcast markets to related anchor detection records;
matching being performed according to a network method wherein criteria include a common national call letter and a base time zone adjusted date and time; and
during said comparison of detections from all broadcast markets according to said network method, creating a new anchor detection record for an unmatched detection if no association is made between said unmatched detection and an existing anchor detection record.

8. A method of analyzing multi-market broadcasts of commercial advertisements, as in claim 7, further comprising, after said comparison according to said network method:
performing a third purge of anchor detection records that are associated with less than a second predetermined minimum number of detections.

9. A method of analyzing multi-market broadcasts of commercial advertisements, as in claim 8, further comprising, after said third purge:
comparing detections from all broadcast markets to anchor detection records, using an associated time adjustment, and associating said detections from all broadcast markets to related anchor detection records; and
matching being performed according to a schedule method wherein a criteria is a common distributor.

10. A method of analyzing multi-market broadcasts of commercial advertisements, as in claim 9, wherein:
said step of associating related ones of said actual market-broadcast instances of said commercial advertisement with a related multi-market broadcast order for said commercial advertisement in a computer database, comprises:
performing a first comparison of detections to multi-market broadcast orders using a first set of criteria; and
after said first comparison, performing a second comparison of detections to multi-market broadcast orders using a second set of criteria, said second comparison comprising a plurality of comparison iterations using various comparison parameters each more permissive than said first set of criteria.

11. A method of analyzing multi-market broadcasts of commercial advertisements, as in claim 10, wherein:
said first set of criteria comprises:
as between a detection and a multi-market broadcast order, a match between:
an agency,
a client,
a broadcast market, and
a call letter;
an ISCI code of the detection record within an ISCI GROUP of the multi-market broadcast order;
a detection date within start and end dates of the multi-market broadcast order;
a day of the detection within allowable weekdays of the multi-market broadcast order;
a time of the detection within start and end times of the multi-market broadcast order.

12. A method of analyzing multi-market broadcasts of commercial advertisements, as in claim 11, wherein a comparison parameter of said second set of criteria comprises:
a first time allowance.

13. A method of analyzing multi-market broadcasts of commercial advertisements, as in claim 11, wherein a comparison parameter of said second set of criteria comprises:
an allowance for an incorrect ISCI code.

14. A method of analyzing multi-market broadcasts of commercial advertisements, as in claim 11, wherein a comparison parameter of said second set of criteria comprises:
an allowance for an incorrect ISCI code of an incorrect duration.

15. A method of analyzing multi-market broadcasts of commercial advertisements, as in claim 11, wherein a comparison parameter of said second set of criteria comprises:
an allowance for an extra spot of the commercial.

16. A method of analyzing multi-market broadcasts of commercial advertisements, as in claim 11, wherein a comparison parameter of said second set of criteria comprises:
an allowance for an extra spot of the commercial and a first time allowance.

17. A method of analyzing multi-market broadcasts of commercial advertisements, as in claim 11, wherein a comparison parameter of said second set of criteria comprises:
a second time allowance.

18. A method of analyzing multi-market broadcasts of commercial advertisements, as in claim 11, wherein a comparison parameter of said second set of criteria comprises:
an allowance for an incorrect ISCI code and an extra spot.

19. A method of analyzing multi-market broadcasts of commercial advertisements, as in claim 11, wherein a comparison parameter of said second set of criteria comprises:
an allowance for an incorrect ISCI code of an incorrect duration and an extra spot.

* * * * *